No. 628,701. Patented July 11, 1899.
F. L. DYER.
COPYING PRESS.
(Application filed May 9, 1899.)
(No Model.)
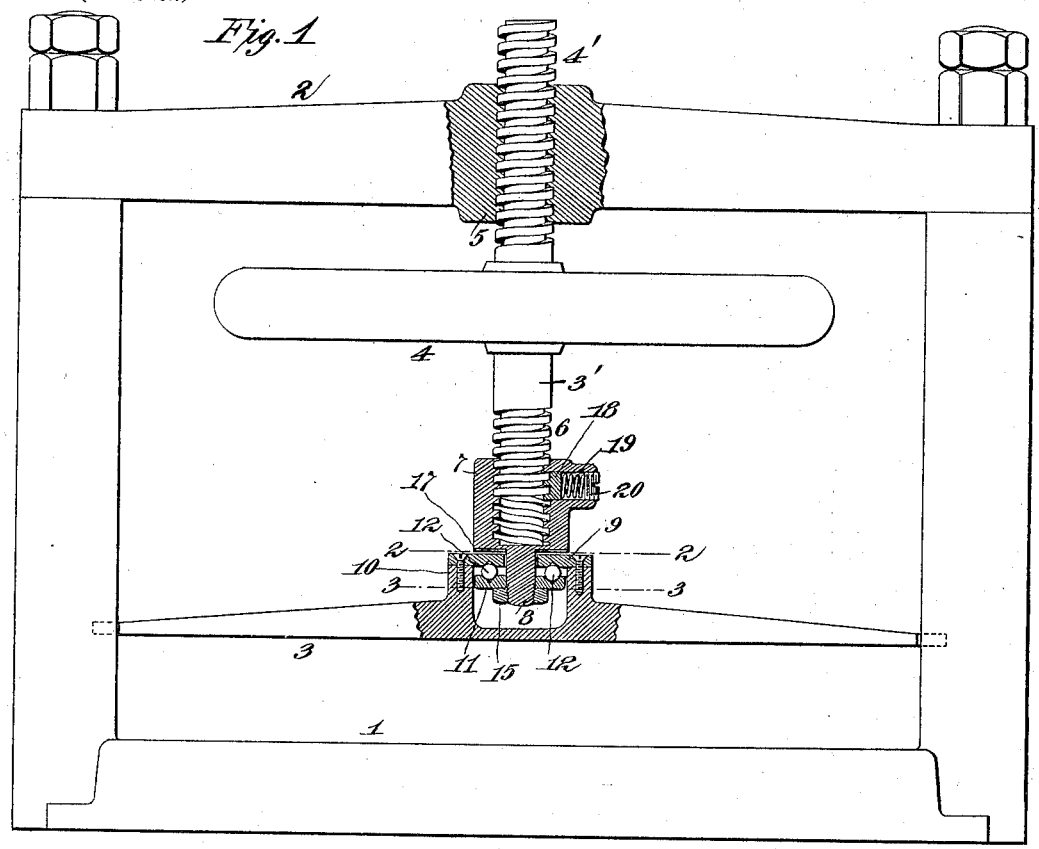
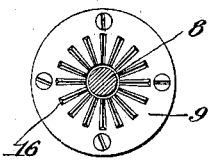
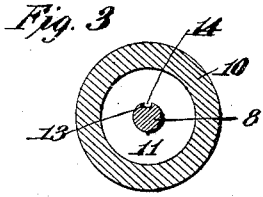
Witnesses:
Inventor

UNITED STATES PATENT OFFICE.

FRANK L. DYER, OF MONTCLAIR, NEW JERSEY, ASSIGNOR TO ALBERT B. DICK, OF CHICAGO, ILLINOIS.

COPYING-PRESS.

SPECIFICATION forming part of Letters Patent No. 628,701, dated July 11, 1899.

Application filed May 9, 1899. Serial No. 716,073. (No model.)

*To all whom it may concern:*

Be it known that I, FRANK L. DYER, a citizen of the United States, residing at Montclair, in the county of Essex and State of New Jersey, have invented a certain new and useful Improvement in Copying-Presses, (Case No. 33,) of which the following is a description.

My invention relates to various new and useful improvements in copying-presses designed particularly for the compression of letter-press books, and the invention is of the type of such presses wherein two distinct rates of movement of the compressing devices are used.

The object of the invention is to provide a simple and efficient copying-press of this type.

In order that the invention may be better understood, attention is directed to the accompanying drawings, forming a part of this specification, and in which—

Figure 1 is a side elevation, partly in section; Fig. 2, a section on the line 2 2 of Fig. 1, and Fig. 3 a section on the line 3 3 of Fig. 1.

In all of the above views corresponding parts are represented by the same numerals of reference.

The lower plate or bed 1 is provided with the usual arch 2. The upper plate or platen 3 is movable toward and away from the lower plate and is usually guided by the arch 2.

3' represents the shaft, which is turned by a handle or wheel 4. The handle or wheel may be placed within the arch, as shown, or above it, as is also common. The shaft 3' is provided with threads 4', which engage a bearing 5 in the arch, and with threads 6, which engage a sleeve 7. The threads 4' and 6 extend in the same direction; but the threads 6 are of a less pitch than the threads 4'. The difference in pitch between these threads determines the power of the compressing pressure and may be varied to suit the requirements of use. The sleeve 7 is provided with a reduced shank 8, which extends through a plate 9, secured to a rim 10, cast with the platen 3. A bearing-plate 11 is carried on the shank 8, below the plate 9, and interposed between the plates 9 and 11 are the antifriction-balls 12. In order to prevent the bearing-plate 11 from turning with respect to the shank 8, the latter is provided with a groove 13, with which a projection 14 on the plate 11 engages. A nut 15, engaging the screw-threads on the shank 8, is used to adjust the plate 11 with respect to the plate 9 to take up any wear. The bearing-plate 9 is preferably suitably roughened on its upper face, for which purpose it may be provided with a series of radiating grooves, ridges, or corrugations 16, as shown in Fig. 3. The under surface of the sleeve 7 is preferably provided with corresponding ridges 17, as shown, whereby when the bottom face of the sleeve 7 engages the upper face of the plate 9 the sleeve will be positively locked against rotation. Instead of corrugating or otherwise roughening the engaging faces of the sleeve 7 and plate 9 these surfaces may be made plain, in which case the friction between the engaging surfaces will lock the sleeve against rotation. Obviously the friction between the sleeve 7 and its threads 6 will be greater than between the antifriction-balls 12 and the plates 9 and 11, so that normally the sleeve 7 will rotate with the shaft 3'. If desired, however, a small friction-block 18 may be used, which is carried with the sleeve 7 and is pressed against the threads 6 of the shaft 3' by a spring 19, adjusted by a screw 20, whereby absolute certainty of the sleeve 7 turning with the shaft 3' will be assured.

The operation will be as follows: Normally the platen 3 will be suspended on the balls 12 from the bearing-plate 11, as shown, the bottom surface of the sleeve 7 being elevated above the top face of the plate 9. The turning of the handle or wheel 4 rotates the shaft 3', and the friction between the sleeve and the threads 6 turns the sleeve with the shaft. The platen 3 is thus allowed to descend solely by the engagement of the threads 4' with the bearing 5, which movement will be relatively rapid. As soon as the platen 3 engages the book or other object to be compressed the descent of the platen will be arrested and the further turning of the wheel 4 will cause the sleeve 7 to descend until its bottom face engages the top face of the plate 9. When this engagement takes place, the sleeve 7 will be locked against rotation, either by the positive engagement of the roughened surfaces or by the friction. When the sleeve 7 ceases to turn, the engagement of the threads 6 with said sleeve permits the shaft to move downward with respect to the sleeve, but at a slower rate than the movement of the shaft downward with respect to the arch, so that a powerful differential screw action takes place, depending for the degree of its power upon the difference between the two threads. In returning, the reverse rotation of the shaft 3' results in a slow upward movement of the platen 3 until the pressure has been sufficiently released to allow the plate 9 to separate from the sleeve 7, whereupon the sleeve will again turn with the shaft, and the platen will be rapidly elevated during the remainder of its travel entirely by the pitch of the screw 4'.

Having now described my invention, what I claim as new, and desire to secure by Letters Patent, is as follows:

1. In a copying-press, the combination with a lower and upper platen, of an arch connected with the lower platen, a shaft having a screw engaging with the arch, a sleeve normally turning with the shaft and engaging a screw thereon of a different pitch, and means for locking the sleeve to the upper platen to hold it against rotation when the object to be compressed has been engaged, substantially as set forth.

2. In a copying-press, the combination with a lower and upper platen, of an arch connected with the lower platen, a shaft having a screw engaging with the arch, a sleeve normally turning with the shaft and engaging a screw thereon of a different pitch, means for locking the sleeve to the upper platen to hold it against rotation when the object to be compressed has been engaged, and a friction-block carried by the sleeve and engaging the shaft, substantially as set forth.

3. In a copying-press, the combination with a lower and upper platen, of an arch connected with the lower platen, a shaft having a screw engaging with the arch, a sleeve normally turning with the shaft and engaging a screw thereon of a different pitch, means for locking the sleeve to the upper platen to hold it against rotation when the object to be compressed has been engaged, a friction-block carried by the sleeve and engaging the shaft, and a spring for pressing said block elastically against the shaft, substantially as set forth.

4. In a copying-press, the combination with a lower and upper platen, of an arch connected with the lower platen, a shaft having a screw engaging with the arch, a sleeve normally turning with the shaft and engaging a screw thereon of a different pitch, means for locking the sleeve to the upper platen to hold it against rotation when the object to be compressed has been engaged, a friction-block carried by the sleeve and engaging the shaft, a spring for pressing said block elastically against the shaft, and a nut for adjusting the tension of said spring, substantially as set forth.

5. In a copying-press, the combination with a lower plate and an upper platen, of an arch connected with said lower plate, a shaft having a screw engaging said arch, a sleeve normally rotating with said shaft and engaging a screw thereon of different pitch, a bearing-plate carried by the sleeve, a plate carried by the upper platen and adapted to be engaged by the sleeve, and antifriction-balls between said plates, substantially as set forth.

6. In a copying-press, the combination with a lower plate and an upper platen, of an arch connected with said lower plate, a shaft having a screw engaging said arch, a sleeve normally rotating with said shaft and engaging a screw thereon of different pitch, a bearing-plate carried by the sleeve, a plate carried by the upper platen and adapted to be engaged by the sleeve, antifriction-balls between said plates, and a nut for adjusting the position of said bearing-plate, substantially as set forth.

7. In a copying-press, the combination with a lower plate or bed, of an arch connected therewith, a shaft having threads engaging said arch, a sleeve normally turning with the shaft and engaging threads of different pitch, an upper platen, a plate carried by the upper platen with which the bottom face of said sleeve is adapted to engage, interlocking surfaces carried by the plate and the bottom face of said sleeve, and means for suspending the platen from said sleeve, whereby the latter will normally turn with the shaft, substantially as set forth.

8. In a copying-press, the combination with a lower plate or bed, of an arch connected therewith, a shaft having threads engaging said arch, a sleeve normally turning with the shaft and engaging threads of different pitch, an upper platen, a plate carried by the upper platen with which the bottom face of said sleeve is adapted to engage, interlocking surfaces carried by the plate and the bottom face of said sleeve, a bearing-plate carried by the sleeve, and antifriction-balls between said bearing-plate and the plate on the platen for suspending the platen from said sleeve, whereby the latter will normally turn with the shaft, substantially as set forth.

This specification signed and witnessed this 8th day of May, 1899.

FRANK L. DYER.

Witnesses:
 JNO. R. TAYLOR,
 ARCHIBALD G. REESE.